United States Patent
Hamid et al.

(10) Patent No.: US 11,336,972 B1
(45) Date of Patent: *May 17, 2022

(54) AUTOMATED VIDEO PREVIEW GENERATION

(71) Applicant: Amazon Technologies, Inc., Seattle, WA (US)

(72) Inventors: Muhammad Raffay Hamid, Seattle, WA (US); Kewen Chen, Bellevue, WA (US); Anne TuAnh Thanh Thuy Ho, Mercer Island, WA (US); Guy Friedel, Bainbridge Island, WA (US); Arun Velayudhan Pillai, Sammamish, WA (US); Dhaval Damani, Redmond, WA (US); Jacob William Jensen, Seattle, WA (US); Zuzanna Maria Stepniakowska Coggins, Seattle, WA (US); Maciej Tadeusz Golonka, Issaquah, WA (US); Anantha Krishna Hodrali Srinivasa Bhatta, Kirkland, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/141,855

(22) Filed: Jan. 5, 2021

Related U.S. Application Data

(63) Continuation of application No. 16/680,825, filed on Nov. 12, 2019, now Pat. No. 10,917,704.

(51) Int. Cl.
*H04N 21/8549* (2011.01)
*G10L 25/78* (2013.01)
(Continued)

(52) U.S. Cl.
CPC ......... *H04N 21/8549* (2013.01); *G10L 25/78* (2013.01); *H04N 21/44008* (2013.01); *H04N 21/44222* (2013.01); *H04N 21/4755* (2013.01)

(58) Field of Classification Search
CPC ......... H04N 21/8549; H04N 21/44008; H04N 21/44222; H04N 21/4755; G10L 25/78
See application file for complete search history.

(56) References Cited

U.S. PATENT DOCUMENTS 9,449,229 B1 * 9/2016 Laska ................ H04N 21/4334
10,917,704 B1 2/2021 Hamid et al.
(Continued)

*Primary Examiner* — Sunghyoun Park
(74) *Attorney, Agent, or Firm* — Eversheds Sutherland (US) LLP

(57) ABSTRACT

Systems, methods, and computer-readable media are disclosed for systems and methods for automated video preview generation. Example methods may include determining video content, determining a first shot transition, a second shot transition, a third shot transition, and a fourth shot transition in the video content, and determining that human speech is present during the first shot transition and the second shot transition. Example methods may include determining a first timestamp associated with the third shot transition, determining a second timestamp associated with the fourth shot transition, generating a first video preview of the video content, where the first video preview includes a segment of the video content from the first timestamp to the second timestamp, and causing presentation of the first video preview, where the first video preview does not include a segment of the video content between the first shot transition and the second shot transition.

20 Claims, 7 Drawing Sheets

(51) Int. Cl.
*H04N 21/44*   (2011.01)
*H04N 21/475*  (2011.01)
*H04N 21/442*  (2011.01)

(56) References Cited

U.S. PATENT DOCUMENTS

| | | |
|---|---|---|
| 2007/0041706 A1 | 2/2007 | Gunatilake |
| 2008/0133213 A1 | 6/2008 | Hatami-Hanza |
| 2011/0081082 A1 | 4/2011 | Jiang et al. |
| 2012/0323573 A1* | 12/2012 | Yoon ............... G09B 19/06 704/236 |
| 2013/0268620 A1* | 10/2013 | Osminer ............ G11B 27/031 709/217 |
| 2014/0245336 A1* | 8/2014 | Lewis, II ........... H04N 21/251 725/14 |
| 2014/0328570 A1* | 11/2014 | Cheng ............ H04N 21/44008 386/241 |
| 2017/0040029 A1* | 2/2017 | Ebenezer ............... G10L 25/18 |
| 2018/0181566 A1* | 6/2018 | Lee ..................... H04W 4/023 |
| 2018/0343482 A1* | 11/2018 | Loheide .......... H04N 21/25883 |
| 2019/0172458 A1 | 6/2019 | Mishra et al. |

\* cited by examiner

AUTOMATED VIDEO PREVIEW GENERATION

CROSS-REFERENCE TO RELATED APPLICATION

This application is a continuation of U.S. application Ser. No. 16/680,825, filed Nov. 12, 2019, which is incorporated by reference in its entirety.

BACKGROUND

Certain digital content, such as movies, television shows, and other video content may be available via streaming. For example, users may stream movies, television series, and so forth using streaming devices, such as smartphones, televisions, etc. The amount of content available may make it difficult for users to select content for consumption. In some instances, users may gauge interest in particular content by watching trailers, such as movie trailers. However, such trailers may require user interaction to access and may be too long. In addition, certain content, such as episodes of television shows, may not have trailers, and users may therefore be unable to gauge interest in such episodes.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
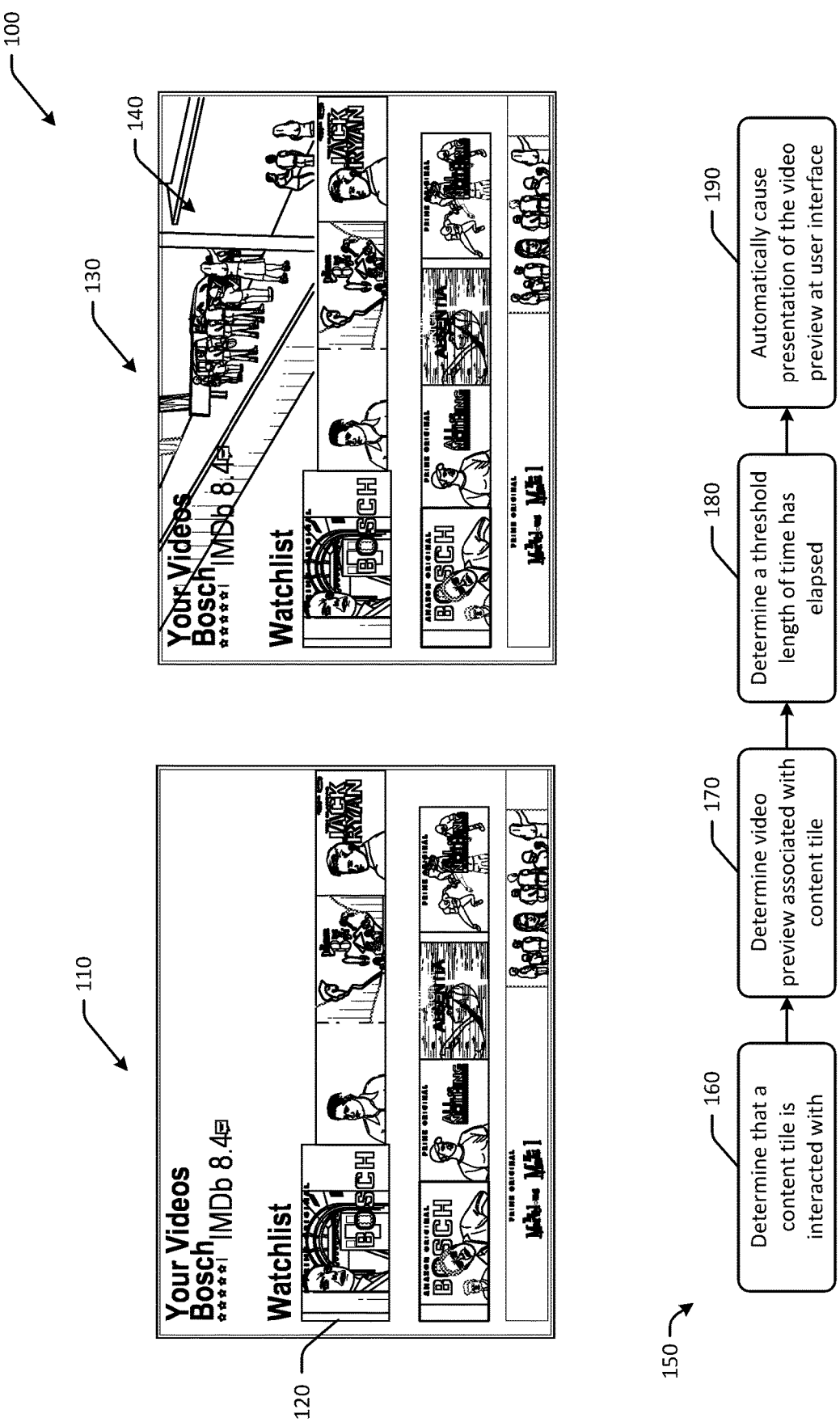
FIG. 1 is a schematic illustration of an example use case for automated video preview generation and presentation in accordance with one or more example embodiments of the disclosure.

Digital content may include video content, such as movies, television shows, streaming shows (e.g., made for Amazon Prime, Netflix, etc.), and other video content. Users may consume such video content using content streaming devices, such as smartphones, televisions, streaming devices coupled to televisions, and other devices. Some movies may include movie trailers that preview the content of a movie. Similarly, some video content, such as a season premiere of an existing television show, or a movie sequel, may include a recap of events that occurred during previous episodes or movies. For example, at the beginning of the episode or movie, a brief recap of events may be presented in the form of clips or segments of the previous movie(s) or episode(s). The recaps may serve to refresh the user's memory and/or to provide context for upcoming events in the current episode or movie. Likewise, movie trailers may be used to provide a preview to a user in order to generate user interest in consuming the entire movie.

Users may find content previews, such as movie trailers, helpful in making decisions regarding content to consume. However, accessing such previews may require the user to take certain actions. In addition, content previews may not always be available, such as for individual television show episodes. Moreover, video streaming services offer a wide variety of movies and television content that can make it difficult for users to decide what to watch. Providing users with video previews of content can expedite a browse and discovery process, and help users make informed decisions.

Embodiments of the disclosure include automatically and semi-automatically generated short video previews of content, such as movies and television episodes. For movies, certain embodiments generate video previews using existing movie trailers by locating shot transitions and human speech or voice activity detection algorithms to identify timestamps to cut trailers into shorter video previews. For television episodes, certain embodiments identify intros and/or recaps that may be present at or near the beginning of a television show episode, and use visual search to automatically find corresponding key scenes as outputs. For both movies and television episodes, certain embodiments can implement manual curation techniques to identify video previews that are most engaging. In addition, playback of video previews may be automatically initiated at a home screen or content selection user interface, so as to reduce the number of interactions a user needs to take to view the video preview (e.g., as opposed to a user going to a content detail page, selecting "watch a trailer" option, etc.).

This disclosure relates to, among other things, devices, systems, methods, computer-readable media, techniques, and methodologies for automated video preview generation and presentation. Certain embodiments may automatically generate video previews for content. Video previews may have different lengths. More than one video preview may be generated for the same content. In some instances, machine learning (e.g., deep neural networks, long short term memory units and/or recurrent neural networks, etc.) may be used to identify whether human speech is present in a certain portion of audio corresponding to a video segment.

Referring to FIG. 1, an example use case 100 for automated video preview generation is depicted in accordance with one or more example embodiments of the disclosure. For example, a user may be perusing video content at a content selection user interface at a first instance 110. While the user peruses, the user may interact with a content tile 120 associated with certain content. For example, the user may highlight the content tile. After a predetermined length of time elapses while the content tile is highlighted, the device may automatically present (and/or a remote server may cause the device to automatically present) a video preview for the content associated with the content tile 120. For example, as illustrated at a second instance 130, a video preview 140 associated with the content tile 120 may be automatically presented at the same user interface. Accordingly, the user may consume the video preview without leaving the user interface, and may therefore gain a better understanding of the plot of the content without having to actually select the content or select a trailer option.

To generate content previews, an example process flow 150 is presented and may be performed, for example, by one or more preview generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 150 of FIG. 1.

At a first block 160, the remote server may determine that a content tile is interacted with. For example, the remote server may determine that the user highlighted the content tile 120, clicked on the content tile 120, hovered over the content tile 120, or otherwise interacted with the content tile 120. The interaction may be determined to have occurred for a predetermined length of time in some instances.

At a second block 170, the remote server may determine a video preview associated with the content tile. For example, the remote server may determine one or more video previews associated with the content tiles. In some embodiments, the remote server may generate the video preview in or near real time, whereas in other embodiments, the video preview may be previously generated and may be selected for presentation at the user interface.

At a third block 180, the remote server may determine that a threshold length of time has elapsed. For example, the remote server may determine that the user has highlighted the content tile 120 for a period of at least two seconds, or another threshold length of time.

At a fourth block 190, the remote server may automatically cause presentation of the video preview at the user interface. For example, as illustrated in FIG. 1, at the content selection user interface (which may be a home page) the video preview 140 may be automatically presented to the user. After presentation of the video preview, in some embodiments, playback of the video content may immediately begin.

As a result, the user may be presented with video previews automatically for various types of video content, such as movies and television shows, where the video previews may be short and highlight the most important or otherwise key events that occur in content.

Embodiments of the disclosure may include automated video preview generation, and may include one or more modules that can be used to analyze digital content. Some embodiments may output on demand video previews. Certain embodiments may use one or more detection modules or algorithms (e.g., object recognition modules, pattern recognition algorithms, etc.) to identify or detect the presence of one or more features in the content, such as shot transitions. In some instances, a module may perform more than one form of analysis. Such detections may be used to generate importance scores for respective segments of content.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain features in content and may use one or more machine learning modules or algorithms. As a result of improved functionality, video previews may be automatically generated. Embodiments of the disclosure may improve computing efficiency and bandwidth by reducing a length of content previews, resulting in reduced file size. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
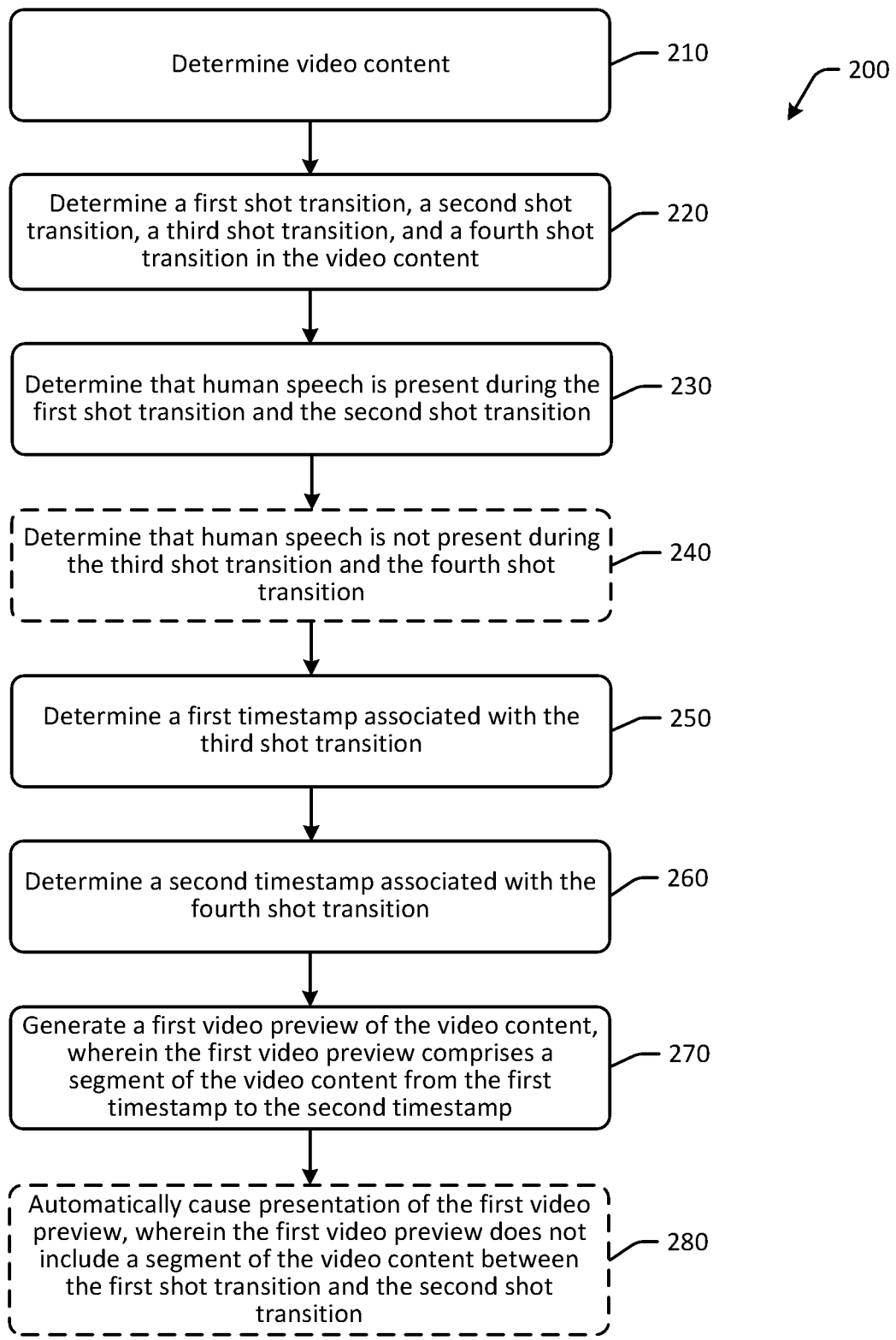
FIG. 2 is a schematic illustration of an example process flow for automated video preview generation in accordance with one or more example embodiments of the disclosure.

FIG. 2 depicts an example process flow 200 for automated video preview generation in accordance with one or more example embodiments of the disclosure. While example embodiments of the disclosure may be described in the context of movies or other video content, it should be appreciated that the disclosure is more broadly applicable to any type of digital content, such as series of video content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine video content. For example, one or more content processing modules at a remote server may determine video content. The video content may be associated with, for example, a movie or television show. For example, the video content may be a movie trailer or a television show recap.

At block 220 of the process flow 200, computer-executable instructions stored on a memory of a device, such as a remote server or a user device, may be executed to determine, a first shot transition, a second shot transition, a third shot transition, and a fourth shot transition in the video content. For example, one or more content processing modules at a remote server may determine a first shot transition, a second shot transition, a third shot transition, and a fourth shot transition in the video content. Shot transitions may be transitions reflected in the video content between different scenes or shots of the movie trailer or content recap. For example, as the trailer transitions from a first part of the movie to another, a shot transition or scene transition may occur. To detect shot transitions, the remote server may analyze individual frames of the video content. In particular, color histograms of individual frames may be generated and compared to determine differences. Based on the differences between contiguous frames, a determination may be made as to whether the frame is a shot transition or a part of a shot transition. Shot transition detection is further discussed with respect to FIGS. 3-4. In some embodiments, the remote server may extract and/or analyze individual frames of video content to determine whether the frames are part of the same shot/scene or a different shot/scene. Analysis of frames may include processing images using one or more object recognition algorithms, determining pixel color values, comparing certain portions of frames to previous or subsequent frames in the video, and the like.

At block 230 of the process flow 200, computer-executable instructions stored on a memory of a device, such as a remote server or a user device, may be executed to determine that human speech is present during the first shot transition and the second shot transition. For example, a preview generation engine and/or one or more preview generation modules at a remote server may determine that human speech is present during the first shot transition and the second shot transition. To determine whether human speech is present during the respective shot transitions, the remote server may extract audio segments corresponding to the respective shot transitions using timestamps from the video content. The extracted audio segments may include audible sounds, such as dialog, sound effects, soundtrack music, and the like corresponding to the video component of the video. The extracted audio segments may include a buffer, such as an additional second before and/or after the shot transition. The extracted audio may be processed to determine a log-mel coefficient and/or other features. The determined features may be input into one or more deep learning networks configured to output a determination as to whether or not the audio segment includes human speech. In some instances, the neural network or deep learning network may output a probability value indicative of a likelihood the audio segment includes human speech, which may be compared to a threshold.

In some embodiments, audio may be processed to extract dialog (e.g., filtered to remove sound effects, music, etc.), and the extracted dialog may be processed using speech-to-text processing algorithms. In an example, an audio processing module may be used to determine the presence of dialog, sound effects, and other instances of audio events that may be used to determine themes of content in a segment.

At optional block 240 of the process flow 200, computer-executable instructions stored on a memory of a device, such as a remote server or a user device, may be executed to determine that human speech is not present during the third shot transition and the fourth shot transition. For example, the preview generation engine at a remote server may determine that human speech is not present during the third shot transition and the fourth shot transition. To determine that human speech is not present, the same deep learning network or neural network(s) may be used to analyze extracted features, and the output of the neural network(s) may be an indication that human speech is not present, or a probability value that does not satisfy the threshold.

At block 250 of the process flow 200, computer-executable instructions stored on a memory of a device, such as a remote server or a user device, may be executed to determine a first timestamp associated with the third shot transition. For example, the preview generation engine at a remote server may determine a first timestamp associated with the third shot transition. The timestamp may correspond to the time at which the third shot transition occurs in the video content, or the movie trailer/television show recap.

In some embodiments, more than one timestamp may be associated with a shot transition, such as a first timestamp at the beginning of a shot transition, and a second timestamp at the end of a shot transition. In such instances, the beginning timestamp may be used. In other instances, the ending timestamp, or any other timestamp that occurs during the shot transition, such as a timestamp between (e.g., anywhere between, halfway between, etc.) the beginning and ending timestamps, may be used.

At block 260 of the process flow 200, computer-executable instructions stored on a memory of a device, such as a remote server or a user device, may be executed to determine a second timestamp associated with the fourth shot transition. For example, the preview generation engine at a remote server may determine a second timestamp associated with the fourth shot transition. The timestamp may correspond to the time at which the fourth shot transition occurs in the video content, or the movie trailer/television show recap.

At block 270 of the process flow 200, computer-executable instructions stored on a memory of a device, such as a remote server or a user device, may be executed to generate a first video preview of the video content, wherein the first video preview comprises a segment of the video content from the first timestamp to the second timestamp. For example, the preview generation engine at a remote server may generate a first video preview of the video content, wherein the first video preview comprises a segment of the video content from the first timestamp to the second timestamp. The first video preview may be one of one or more video previews generated for the video content. The first video preview may include a portion of the video content corresponding to the timestamps of the shot transitions where there was human speech detected.

At optional block 280 of the process flow 200, computer-executable instructions stored on a memory of a device, such as a remote server or a user device, may be executed to automatically cause presentation of the first video preview, wherein the first video preview does not include a segment of the video content between the first shot transition and the second shot transition. For example, the preview generation engine at a remote server may automatically cause presentation of the first video preview, wherein the first video preview does not include a segment of the video content between the first shot transition and the second shot transition. As a result, the video preview may not start and/or end at a point where human speech is present.

The first video preview may have a length that is less than the movie trailer or content recap. However, in other instances, such as that described with respect to FIG. 6, the first video preview may have a length that is longer than a movie trailer or content recap. The automatic presentation may reduce the number of interactions a user may need to have with a device in order to get a glimpse or preview of video content, and the automatic playback may occur immediately or after a predetermined length of time has elapsed. For example, the automatic playback may occur after a content icon or tile associated with the video content has been highlighted or selected for two seconds or another length of time. In some embodiments, presentation of the video preview may be automatically initiated at a content selection home page (e.g., a user may not have to navigate to a detail page, etc.) responsive to highlighting of a tile associated with the video content. After the first video preview is presented (e.g., the remote server may determine that the first video preview was presented in its entirety, etc.), the remote server may cause playback of the video content automatically. For example, the actual content may begin playback after the preview is presented.

Accordingly, embodiments of the disclosure may automatically generate video previews that capture a compelling story, meet aesthetic standards, does not start and end in the middle of a dialogue, does not reveal spoilers, includes key characters, and so forth.

Figure 3:
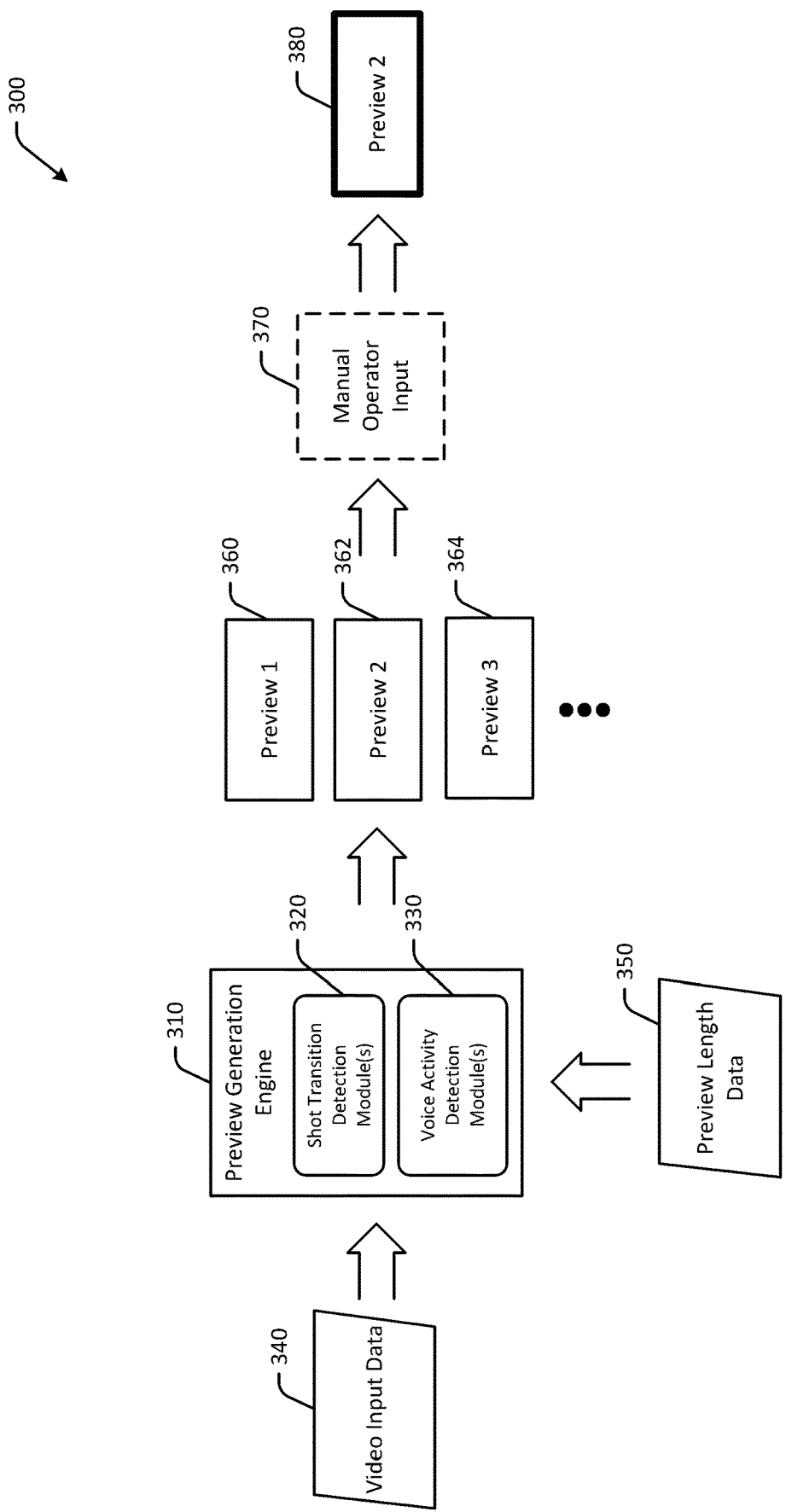
FIG. 3 is a schematic illustration of an example data flow for generating video previews in accordance with one or more example embodiments of the disclosure.

FIG. 3 is a schematic illustration of an example data flow 300 for generating video previews in accordance with one or more example embodiments of the disclosure. Different embodiments may include different, additional, or fewer inputs or outputs than those illustrated in the example of FIG. 3.

In FIG. 3, the hybrid process and data flow may be used to generate video previews using either movie trailers or television show recaps. For example, previews generated using movie trailers may include one or more thirty to sixty second (or any other suitable time length) video previews. The starting and ending points (represented by timestamps) of video previews may be cut from the full-length trailer or content recap in a manner that is minimally disruptive and is representative of the content plot. To automatically find the minimally disruptive starting and ending points, embodiments may implement a combination of shot transition detection and voice activity detection algorithms to ensure that the start and end timestamps occur at shot transitions with no human speaking over them. The automatically generated video previews may then be presented to human curators to select the previews that are most preferable (e.g., most representative of the plot as shown in the full-length input trailer, etc.).

In FIG. 3, an example data flow 300 is schematically depicted. A preview generation engine 310 and/or one or more preview generation module(s) may be configured to generate video previews for content using movie trailers or content recaps. The preview generation engine 310 may be stored at and/or executed by one or more remote servers. The preview generation engine 310 may include one or more modules or algorithms, and may be configured to generate video previews for content using movie trailers or content recaps.

For example, the preview generation engine 310 may include one or more shot transition detection modules 320, and/or one or more voice activity detection modules 330. Additional or fewer, or different, modules may be included. The shot transition detection module(s) 320 may be configured to process and/or analyze video content. For example, the shot transition detection module(s) 320 may be configured to determine frames or sets of frames of video content and may be configured to detect certain features, such as changes between consecutive frames. In some embodiments, the shot transition detection module(s) 320 may be configured to generate color histograms for individual frames of video content. The color histograms may be compared to determine the presence of shot transitions.

A shot may be a series of contiguous frames captured in a single uninterrupted recoding. In some instances, a shot may be a scene of the content. The shot transition detection module(s) 320 may be configured to detect shot transitions by determining differences between frames. For example, the content of adjacent frames within a shot may be more similar to each other than adjacent frames across two adjacent shots. If the content of one frame is different enough from the next frame, it can be inferred that a shot transition has happened between them. For each frame in a shot, the shot transition detection module(s) 320 may be used to compute a color (HSV) histogram. The shot transition detection module(s) 320 may be configured to find histogram distances between features of contiguous frames and threshold these differences. For example, a Bhattacharyya distance metric may be used to compute histogram distances as follows:

$$d(H_1, H_2) = \sqrt{1 - \frac{1}{\sqrt{\overline{H_1}\overline{H_2}N^2}} \sum_I \sqrt{H_1(I) \cdot H_2(I)}}$$

where $H_1$ and $H_2$ represent the two histograms of the two frames respectively, N is the total number of histogram bins, and $$\overline{H}_k = \frac{1}{N} \sum_I H_k(I)$$

Given an input full-length trailer, the shot transition detection module(s) 320 may detect all of the shot transitions present in the content. The frame-histogram distance calculated using this equation may be compared to a threshold to determine whether the distance is large enough to indicate that a shot transition has taken place.

The voice activity detection module(s) 330 may be configured to determine whether human speech is present in the audio that corresponds to the detected shot transitions. For example, for each shot transition, the voice activity detection module(s) 330 may determine whether human speech is present in the corresponding audio segment. For example, the voice activity detection module(s) 330 may extract the audio (which may include a buffer) that corresponds to a detected shot transition, and may process the audio to determine whether human speech is present. Additional detail regarding voice activity detection is provided with respect to FIG. 5. If voice activity or human speech is detected during a shot transition, the corresponding shot may not be deleted or used as a starting/ending point, as the preview may then abruptly start or stop with partial human speech, leading to a less positive end user experience.

The preview generation engine 310 may determine a minimally disruptive subset of shot transitions where no human speech is present, and may use corresponding video segments as the starting and/or ending points to cut the input trailer from/to and generate multiple short previews. For example, the preview generation engine 310 may receive one or more inputs that may be used to generate video previews automatically. In FIG. 3, the preview generation engine 310 may receive one or more of video input data 340 associated with content for which a video preview is to be generated, and/or preview length data 350 that may be used to determine how long video previews should be (e.g., 30 seconds, 45 seconds, 60 seconds, etc.). In some embodiments, the video content data 340 may be associated with audio data and/or text data that may be extracted from a content file.

The preview generation engine 310 may process the respective data to generate a video preview. For example, the video data 340 may be processed using one or more of the shot transition detection module(s) 320 and/or the voice activity detection module(s) 330.

The preview generation engine 310 may be configured to output one or more video previews. For example, using the video input data 340, which may be a movie trailer, a television show recap, and so forth, the preview generation engine 310 may output a first video preview 360, a second video preview 362, a third video preview 364, and so forth. Any number may be generated. The video previews may have the same or different lengths. Some or all of the video preview may include different segments of the video content (e.g., trailer or recap).

In some embodiments, the output video previews may be sent to a manual operator for review. The manual operator may select the video previews that should be used for automatic presentation to end users. Accordingly, an optional manual operator input 370 may be used to determine which of the video previews should be used. A final selection 380 may be the second video preview 362 for presentation to users that may be interested in the video content associated with the input trailer or recap.

Figure 4:
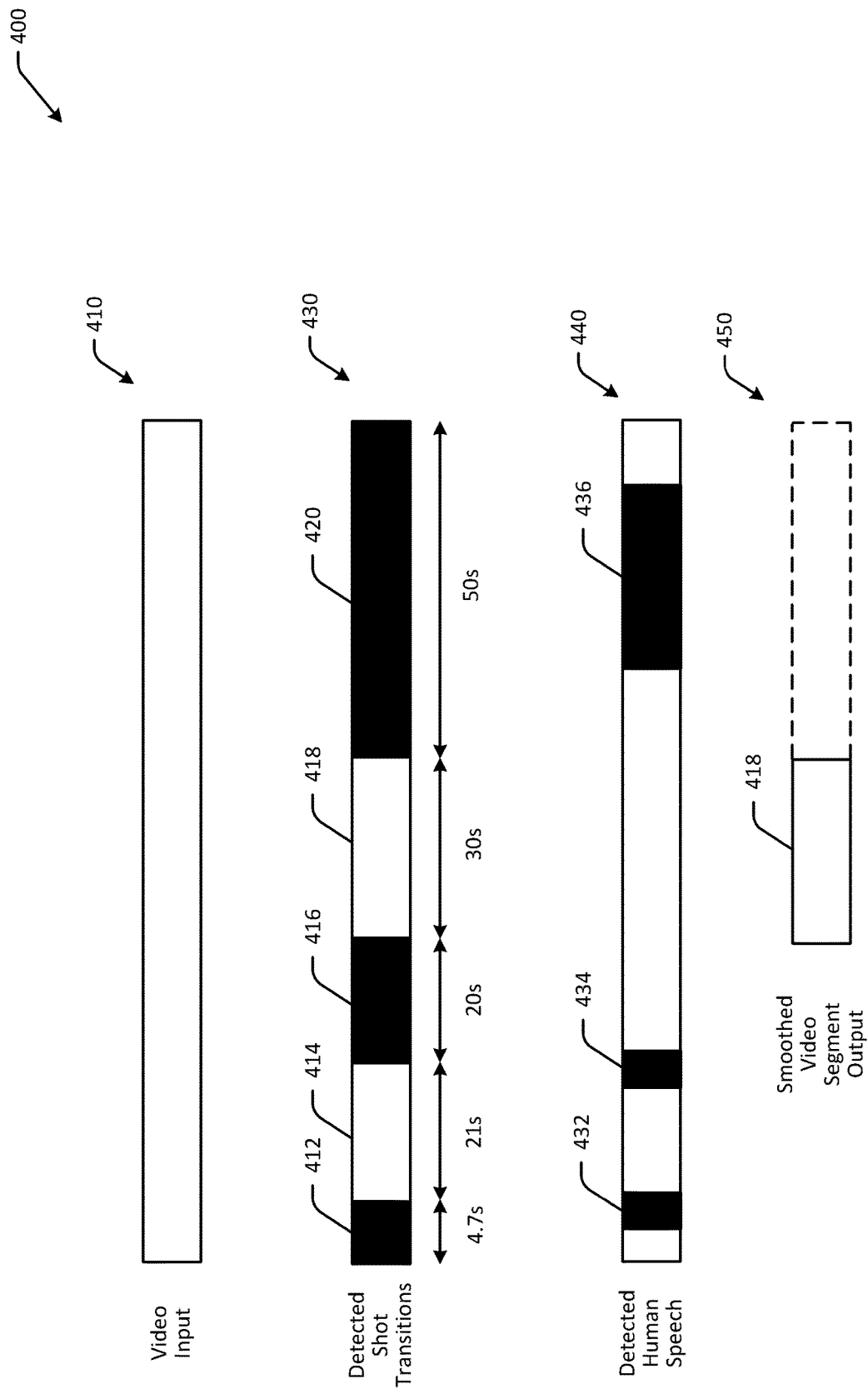
FIG. 4 is a schematic illustration of example segment identification in accordance with one or more example embodiments of the disclosure.

FIG. 4 is a schematic illustration of example segment identification 400 in accordance with one or more example embodiments of the disclosure. In FIG. 4, video content 410 is represented in a bar format and may include a number of different segments. The content may be a movie trailer, television show recap, or other video synopses content. Segments may correspond to certain scenes or segments of the content 410 and may or may not be continuous, and may have different lengths. Segments may be identified using one or more timestamps. The segments of content 410 are illustrated in alternating black and white blocks for illustrative purposes only.

In FIG. 4, the video input 410 may be processed, such as by the preview generation engine discussed with respect to FIG. 3, to detect shot transitions 430. For example, the video input 410 may be processed to determine that a first shot transition occurs 4.7 seconds into the video content, or after a first shot 412 of the video content. The first shot 412 may be a first scene of the video content 412. A second shot transition may be determined to occur twenty-one seconds after the first shot transition, or after a second shot 414 of the video content. A third shot transition may be determined to occur twenty seconds after the second shot transition, or after a third shot 416 of the video content. A fourth shot transition may be determined to occur thirty seconds after the third shot transition, or after a fourth shot 418 of the video content. A fifth shot transition may be determined to occur fifty seconds after the fourth shot transition, or after a fifth shot 420 of the video content.

In an example, shot transition detection may be performed by determining a first color histogram for a first frame of the video content, determining a second color histogram for a second frame of the video content, where the second frame is consecutive to the first frame, determining that a distance between the first color histogram and the second color histogram satisfies a shot transition threshold, and determining that the first shot transition occurs at the second frame.

After the shot transitions are detected, the preview generation engine may determine whether any human speech is present during any of the shot transitions 440. If human speech is present, the timestamp corresponding to the shot transition may not be used for a starting or ending point of a video preview, as the end result may not be easily understood by a user (e.g., the human speech may be interrupted or start in middle of dialog, etc.).

For example, the preview generation engine may determine that first human speech 432 is present during the first shot transition (as indicated by the overlap of the black bar in 440 and the black/white boxes in 430), that second human speech is present during the second shot transition, and that third human speech is present during a portion of the fifth segment 420.

Accordingly, a first video preview 450 generated by the preview generation engine may include the scene corresponding to the fourth shot 418 of the content. In some instances, just the fourth shot 418 or scene may be included, while in other instances, a subsequent shot or another portion of the video content may be included in the first video preview 450 (as indicated by the dashed lines in FIG. 4. The first and second shot transitions may both be excluded from the first video preview, or may be included as part of a larger portion of the first video preview.

In some embodiments, the first video preview 450 may be smoothed, so as to improve aesthetic appearance to users. Smoothing may include audio-visual smoothing. For example, the preview generation engine may process the first video preview using one or more audio-visual smoothing algorithms. Processing may include application of fade-in and fade-out based audio-visual smoothing.

Figure 5:
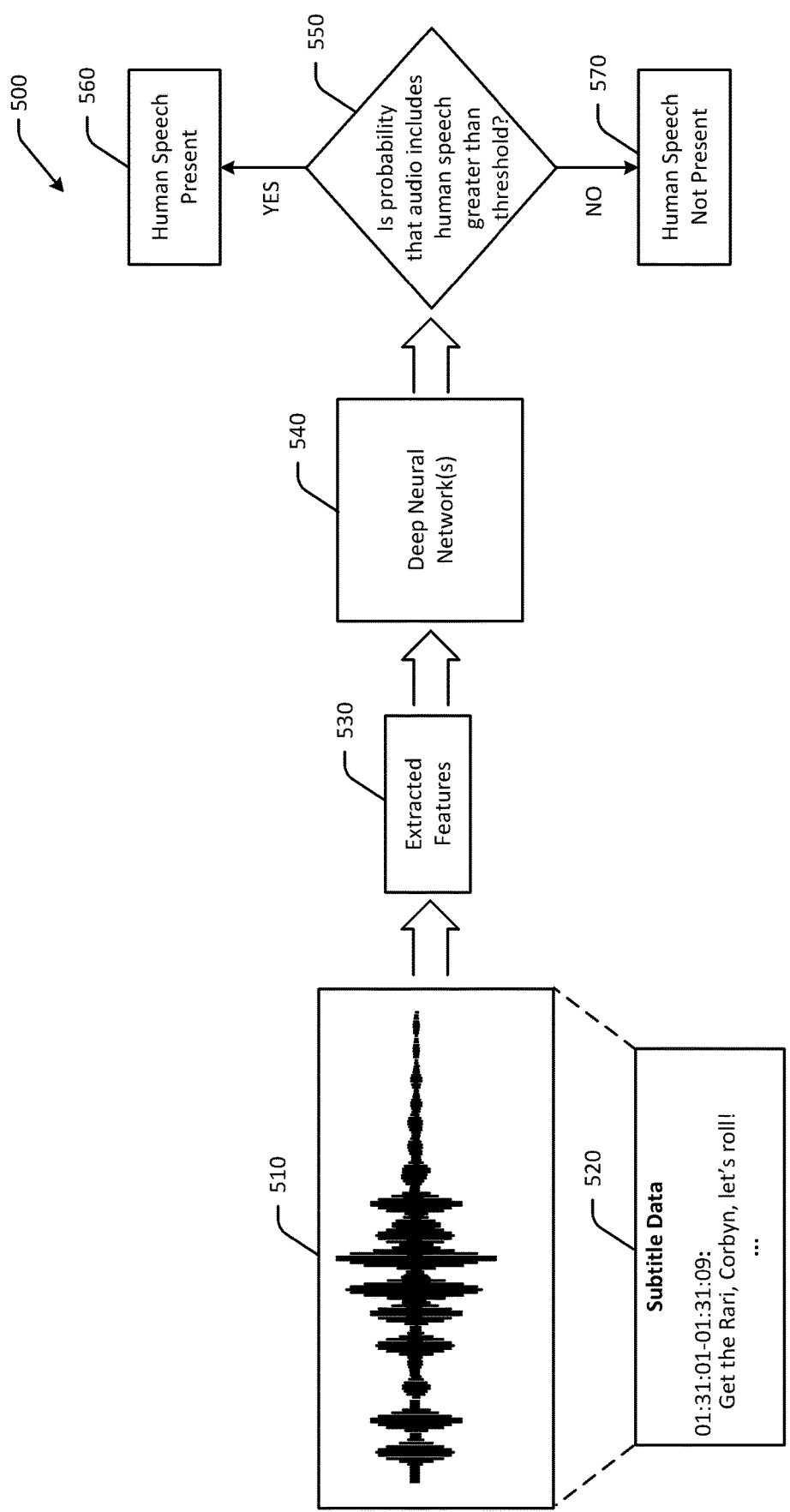
FIG. 5 is a schematic illustration of example human speech detection in accordance with one or more example embodiments of the disclosure.

FIG. 5 is a schematic illustration of example human speech detection 500 in accordance with one or more example embodiments of the disclosure. Different embodiments may include different, additional, or fewer inputs or outputs than those illustrated in the example of FIG. 5.

The hybrid process and data flow of FIG. 5 may be used to determine whether human speech occurs during a certain audio segment. For example, an audio segment corresponding to a video segment that spans a shot transition may be processed to determine whether human speech is present in the audio segment. If so, it may be assumed that the human speech is dialog between characters, and that therefore the video segment should not be deleted from, for example, a content recap or movie trailer. If not, the video segment may be considered as a candidate for deletion from the content recap or movie trailer.

To determine whether human speech is present in an audio segment, some embodiments may extract frequency domain features, and may use such features with a supervised learning model to determine whether human speech is present. In some instances, subtitle data may be used in conjunction with audio analysis output to determine whether human speech is present.

In FIG. 5, an audio segment 510 may be determined. For example, the audio segment 510 may be extracted from a video file or may otherwise be determined from a content file. The audio segment 510 may correspond to audio from a content recap or movie trailer at a detected shot transition. For example, the audio segment 510 may correspond to the first shot transition in a movie trailer. The audio segment 510 may include an audio buffer, such as audio from a half second before the shot transition and/or a half second after the shot transition. In some embodiments, subtitle data 520 corresponding to the audio segment 510 may be determined. In such instances, the subtitle data 520 may be determined using timestamps in the original or full content that correspond to the scene in the content recap or movie trailer. Subtitle data 520 may be used for model training and/or as an additional signal indicative of a likelihood that human speech is present at a certain point in the audio.

The audio segment 510 may be processed to extract one or more features 530. The extracted features 530 may include one or more of log-mel coefficients, spectrograms, dictionary-based features, and/or other features.

The extracted features 530 may be input at one or more deep neural networks 540. The deep neural network 540 may be configured to determined, based at least in part on the extracted features, a probability value indicative of whether or not the audio segment 510 includes human speech. The deep neural network 540 may include a machine learning model, such as a long short term memory machine learning mode, a gated recurrent unit machine learning model, and the like.

For example, the deep neural network 540 may process audio segments (or the extracted features) to detect voice activity. In some embodiments, the deep neural network 540 may generate a spectrogram, such as a magnitude spectrogram, using the audio segment 510. The spectrogram may include frequency along a vertical axis and time along a horizontal axis. Using the spectrogram or the log-mel coefficient, the deep neural network 540 may determine one or more probability values. For example, the deep neural network 540 may determine a first probability value indicative of whether the first audio segment 510 includes voice activity, and may determine an optional second probability value indicative of whether the first audio segment 510 does not include voice activity.

In some embodiments, the deep neural network 540 or another module may be executed to determine, at determination block 550, whether the probability that the sound in the audio segment 510 is human speech is greater than a threshold. For example, the threshold may be user-set and could be 50%, 75%, 95%, or another threshold. If it is determined at determination block 550 that the probability that the sound in the audio segment 510 is human speech is greater than the threshold, it may be determined at block 560 that human speech is present in the audio segment 510. If it is determined at determination block 550 that the probability that the sound in the audio segment 510 is human speech is not greater than the threshold, it may be determined at block 570 that human speech is not present in the audio segment 510.

Accordingly, in some embodiments, an audio segment corresponding to a first shot transition may be determined, where the audio segment comprises a leading buffer (e.g., 1 second, etc.) and/or a trailing buffer (e.g., 1 second, etc.). A log-mel coefficient of the audio segment or its features may be determined, and, using a neural network and the log-mel coefficient/features, it may be determined that human voice is present in the audio segment.

Figure 6:
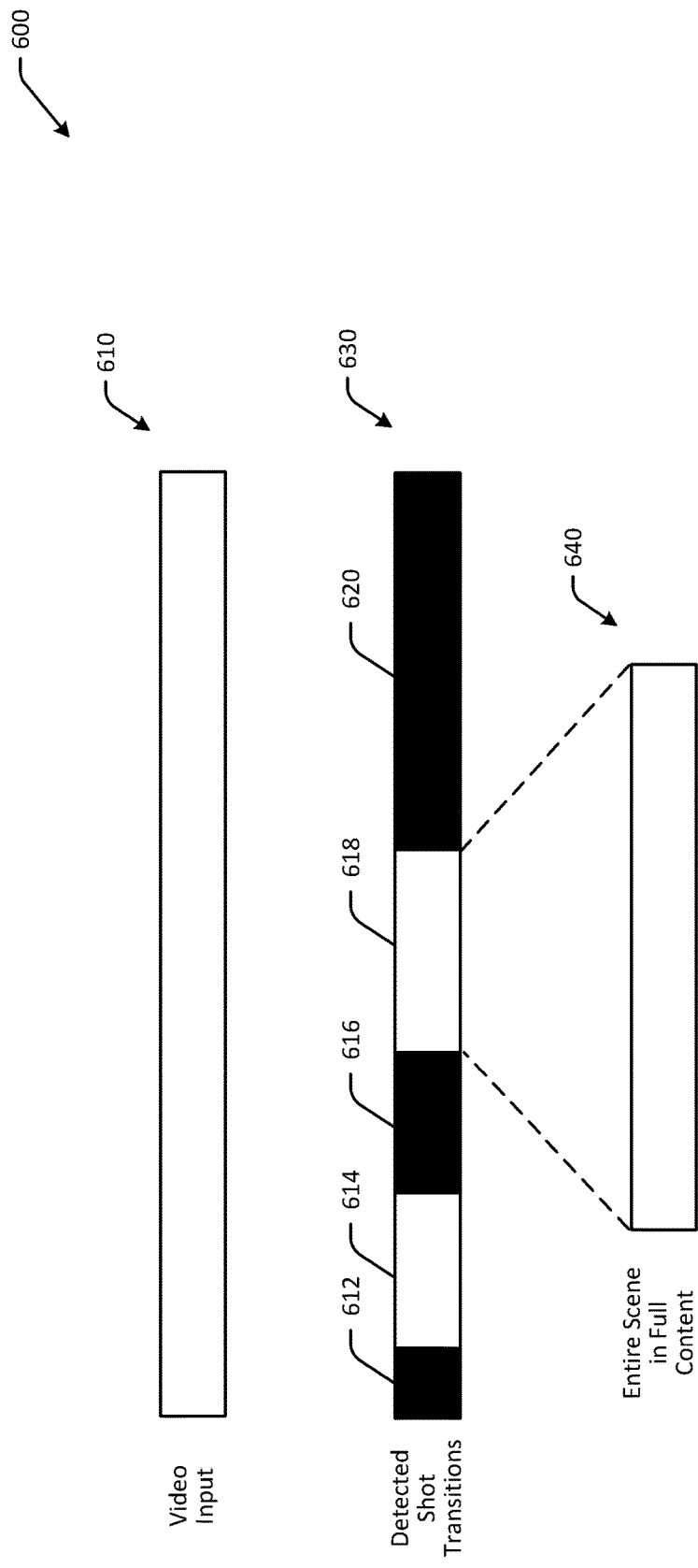
FIG. 6 is a schematic illustration of example shot detection and selection in accordance with one or more example embodiments of the disclosure.

FIG. 6 is a schematic illustration of example shot detection and selection 600 in accordance with one or more example embodiments of the disclosure. The shot detection (or shot transition detection) and selection of FIG. 6 may be applicable to instances where a content recap is provided instead of a content trailer. For example, while movies may have associated trailers, television shows may not have associated trailers. However, in some instances, television shows may have content recaps that are presented at or near a beginning of a television show episode. The content recap for a television show may be a recap of content that occurred in previous episode(s) of the television show.

Accordingly, rather than selecting a segment of the recap as a video preview for automatic playback to users at a user interface, such as a content search or selection user interface or home screen user interface, some embodiments may identify shots or scenes that are included in a content recap, and may determine the associated full scene or shot in the original content for presentation as the video preview. For example, if five seconds of a full scene are included in the content recap, and the actual scene from which the five seconds is derived is twenty seconds, some embodiments may determine the full twenty second video segment and use that segment as the video preview. Accordingly, some video previews may not actually be a preview of content in a certain episode, but may include content from previous episodes of a television show. In this manner, a user may still get a feel for the type of content in the television show, while at the same time avoiding accidental presentation of spoilers to the user.

In FIG. 6, a video input 610 may be a content recap for a television show or other video content for which the content recap covers events or scenes that occurred in previous episodes of the video content (as opposed to movie trailers, which may cover events that occur in the movie). In some embodiments, the video input 610 may be a movie trailer.

The video content 610 is represented in a bar format and may include a number of different segments. Segments may correspond to certain scenes or shots that occurred in previous episodes of the television content, and may or may not be continuous, and may have different lengths. Segments may be identified using one or more timestamps.

The video content 610 may be an input to a preview generation engine, such as that described with respect to FIG. 3. The preview generation engine may be configured to detect shot transitions that occur in the video content 610. The shot transitions may be portions of the video content that transition from a first shot or scene to another. To detect shot transitions, color histograms may be generated for individual frames, and may be compared to determine whether a difference between respective histograms satisfies a transition threshold. If so, the frame may be determined to be a shot transition, and a corresponding timestamp may be determined as a starting or ending point of the shot transition.

In the example of FIG. 6, shot transitions may be determined to separate various segments of video 630. For example, a first video segment 612 may be separated from a second video segment 614 by a first shot transition, the second video segment 614 may be separated from a third video segment 616 by a second shot transition, the third video segment 616 may be separated from a fourth video segment 618 by a third shot transition, the fourth video segment 618 may be separated from a fifth video segment 620 by a fourth shot transition, and so forth.

In some embodiments, the preview generation engine may also be configured to determine whether human speech is present at any of the first, second, third, or fourth shot transitions. If so, those shot transitions and the corresponding video segment (e.g., either or both the segments preceding or following the shot transition, etc.) may optionally be used for subsequent full scene detection. If not, those shot transitions and the corresponding video segment(s) may be optionally deleted. The segments of video 630 are illustrated in alternating black and white blocks for illustrative purposes only.

After determining the shot transitions, the preview generation engine may search the previous episodes associated with the television show to locate the entire scene from which the shot or scene in the content recap was pulled. For example, the fourth video segment 618 may correspond to an entire scene 640 in a previous episode of the television show. The fourth video segment 618 may be a snippet of the entire scene 640, and may have a shorter length than the entire scene 640. For example, the fourth video segment 618 may be eight seconds long, whereas the entire scene 640 in the original episode or video content may be twenty seconds.

The preview generation engine may therefore locate the entire scene 640, and the entire scene 640 may be used as a video preview for the television episode. Accordingly, the entire scene 640 may be presented automatically at a home screen or other user interface. For example, if a user selects or hovers on a tile associated with the television show and/or particular episode, the entire scene 640 may automatically be presented to provide context to the user. The video preview may therefore be a preview of content that occurred in a previous television show episode in some embodiments In some embodiments, the preview generation engine may locate a segment of the video content 610 using a first timestamp corresponding to a first shot transition and a second timestamp corresponding to a second timestamp. The preview generation engine may determine that a scene corresponding to the segment is longer than the first timestamp to the second timestamp, and may therefore determine a third timestamp and a fourth timestamp corresponding to the scene in the original video content.

In some instances, more than one video preview may be generated for the television show episode, and manual input may be used to select a particular video preview for automatic presentation to users. For example, some or all of the scenes corresponding to the segments in the video recap may be determined and used as candidates (e.g., the scene corresponding to the first segment 612, the scene corresponding to the second segment 614, etc.). A manual operator may pick the scene most preferable to use as a video preview from amongst the automatically generated video previews.

Accordingly, although trailers may be unavailable for television show episodes, embodiments of the disclosure may automatically generate video previews for presentation at user interfaces. In some embodiments, deep visual features may be extracted for each kth frame of the set of shots that occur in the content recap, and a nearest neighbor operation may be performed on the shot features. Every kth frame-window of the title features may be processed, and the best match at timestamp t may be selected.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
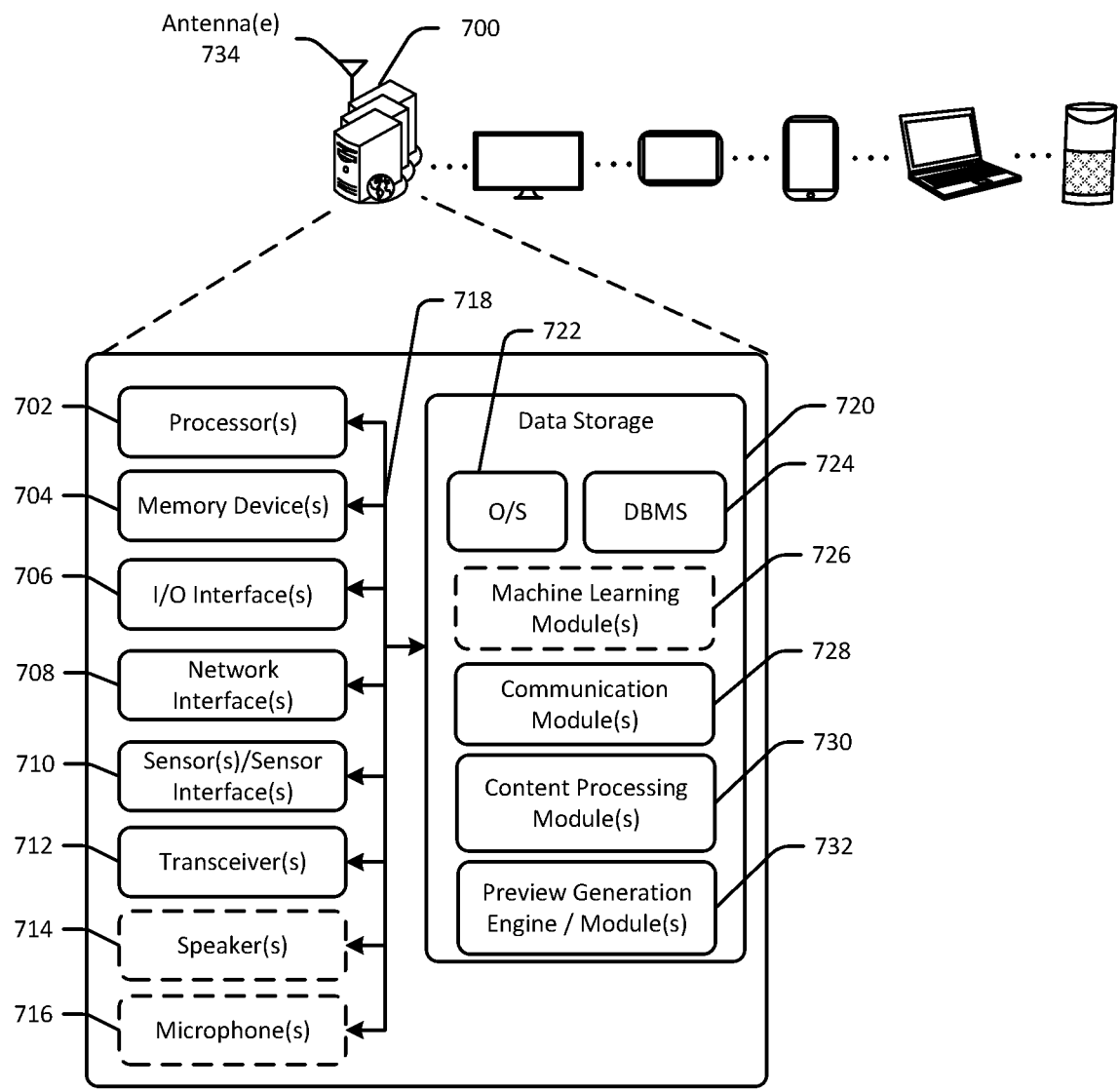
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of video preview generation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more content processing module(s) 730, and/or one or more preview generation engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user action information, user profile information, historical content consumption information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining preview length, determining probability thresholds for human speech detection, determining a number of segments to include in a video summary, determining frames of content, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content processing module(s) 730 may include computer-executable instructions, code, or the like that responsive to execution by one or more of the processor(s) 702 may perform functions including, but not limited to, analyzing digital content, extracting frames, determining pixel color values, determining color histrograms, determining audio content, determining or analyzing text and/or audio files, identifying certain portions of content, extracting segments of content, and the like.

The preview generation engine/module(s) 732 may include computer-executable instructions, code, or the like that responsive to execution by one or more of the processor(s) 702 may perform functions including, but not limited to, selecting segments or portions of segments to include in a video preview, selecting music or portions of music or other sounds to include in a summary video file, selecting a specific preview for a user based on user preferences, generating video previews, determining elapsed times, determining consumed portions, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, video content for which an automated video trailer is to be generated;
   determining a first scene of the video content that is associated with a user favorite rating greater than a threshold;
   determining a first timestamp and a second timestamp associated with the first scene;
   determining that human speech is not present during the first timestamp and the second timestamp;
   generating, based at least in part on the first timestamp and the second timestamp, a first video preview of the video content, wherein the first video preview comprises a first segment of the video content comprising the first scene; and
   causing presentation of the first video preview.

2. The method of claim 1, further comprising:
   determining that human speech is not present during a first time interval before the first timestamp, and a second time interval after the first timestamp.

3. The method of claim 1, further comprising:
determining that the user favorite rating associated with the first scene is a highest user favorite rating for a scene in the video content.

4. The method of claim 1, further comprising:
determining a set of user preferences associated with a user account;
determining that the set of user preferences indicates a preference for action scenes;
determining a second scene of the video content that is an action scene; and
determining a third timestamp and a fourth timestamp associated with the second scene;
wherein generating the first video preview of the video content comprises generating, based at least in part on the first timestamp, the second timestamp, the third timestamp, and the fourth timestamp, the first video preview of the video content, wherein the first video preview comprises the first segment of the video content comprising the first scene, and a second segment of the video content comprising the second scene.

5. The method of claim 1, wherein the user favorite rating comprises an average user rating for the first scene from a plurality of user accounts.

6. The method of claim 1, further comprising:
generating a second video preview of the video content, wherein the second video preview comprises a different segment of the video content;
wherein the second video preview has a first length that is different than a second length of the first video preview.

7. The method of claim 1, further comprising:
generating a second video preview of the video content, wherein the second video preview comprises a different segment of the video content; and
determining an indication from a human operator that the first video preview is preferable to the second video preview.

8. The method of claim 1, further comprising:
processing the first video preview using one or more audio-visual smoothing algorithms;
wherein the first video preview is a preview of content that occurred in a previous television show episode.

9. The method of claim 1, wherein determining that human speech is not present during the first timestamp comprises:
determining an audio segment corresponding to the first timestamp, wherein the audio segment comprises a leading buffer and a trailing buffer;
determining a log-mel coefficient of the audio segment; and
determining, using a neural network and the log-mel coefficient, that human voice is present in the audio segment.

10. The method of claim 1, further comprising:
determining that the first video preview was presented in its entirety; and
causing playback of the video content automatically.

11. The method of claim 1, wherein presentation of the first video preview is automatically initiated at a content selection home page responsive to highlighting of a tile associated with the video content.

12. A device comprising:
memory that stores computer-executable instructions; and
at least one processor configured to access the memory and execute the computer-executable instructions to:
determine video content for which an automated video trailer is to be generated;
determine a first scene of the video content that is associated with a user favorite rating greater than a threshold;
determine a first timestamp and a second timestamp associated with the first scene;
determine that human speech is not present during the first timestamp and the second timestamp;
generate, based at least in part on the first timestamp and the second timestamp, a first video preview of the video content, wherein the first video preview comprises a first segment of the video content comprising the first scene; and
cause presentation of the first video preview.

13. The device of claim 12, wherein the at least one processor is further configured to access the memory and execute the computer-executable instructions to:
determine that human speech is not present during a first time interval before the first timestamp, and a second time interval after the first timestamp.

14. The device of claim 12, wherein the at least one processor is further configured to access the memory and execute the computer-executable instructions to:
determine that the user favorite rating associated with the first scene is a highest user favorite rating for a scene in the video content.

15. The device of claim 12, wherein the at least one processor is further configured to access the memory and execute the computer-executable instructions to:
determine a set of user preferences associated with a user account;
determine that the set of user preferences indicates a preference for action scenes;
determine a second scene of the video content that is an action scene; and
determine a third timestamp and a fourth timestamp associated with the second scene;
wherein the at least one processor is configured to generate the first video preview of the video content by executing the computer-executable instructions to:
generate, based at least in part on the first timestamp, the second timestamp, the third timestamp, and the fourth timestamp, the first video preview of the video content;
wherein the first video preview comprises the first segment of the video content comprising the first scene, and a second segment of the video content comprising the second scene.

16. The device of claim 12, wherein the user favorite rating comprises an average user rating for the first scene from a plurality of user accounts.

17. The device of claim 12, wherein the at least one processor is further configured to access the memory and execute the computer-executable instructions to:
generate a second video preview of the video content, wherein the second video preview comprises a different segment of the video content;
wherein the second video preview has a first length that is different than a second length of the first video preview.

18. The device of claim 12, wherein the at least one processor is further configured to access the memory and execute the computer-executable instructions to:
generate a second video preview of the video content, wherein the second video preview comprises a different segment of the video content; and
determine an indication from a human operator that the first video preview is preferable to the second video preview.

19. The device of claim 12, wherein the at least one processor is further configured to access the memory and execute the computer-executable instructions to:
- process the first video preview using one or more audio-visual smoothing algorithms;
- wherein the first video preview is a preview of content that occurred in a previous television show episode.

20. The device of claim 12, wherein the at least one processor is further configured to access the memory and execute the computer-executable instructions to:
- determine that the first video preview was presented in its entirety; and
- cause playback of the video content automatically.

\* \* \* \* \*